Jan. 31, 1956   R. L. CULBERTSON   2,733,042
EMERGENCY OXYGEN VALVE
Filed Dec. 13, 1954   2 Sheets-Sheet 1
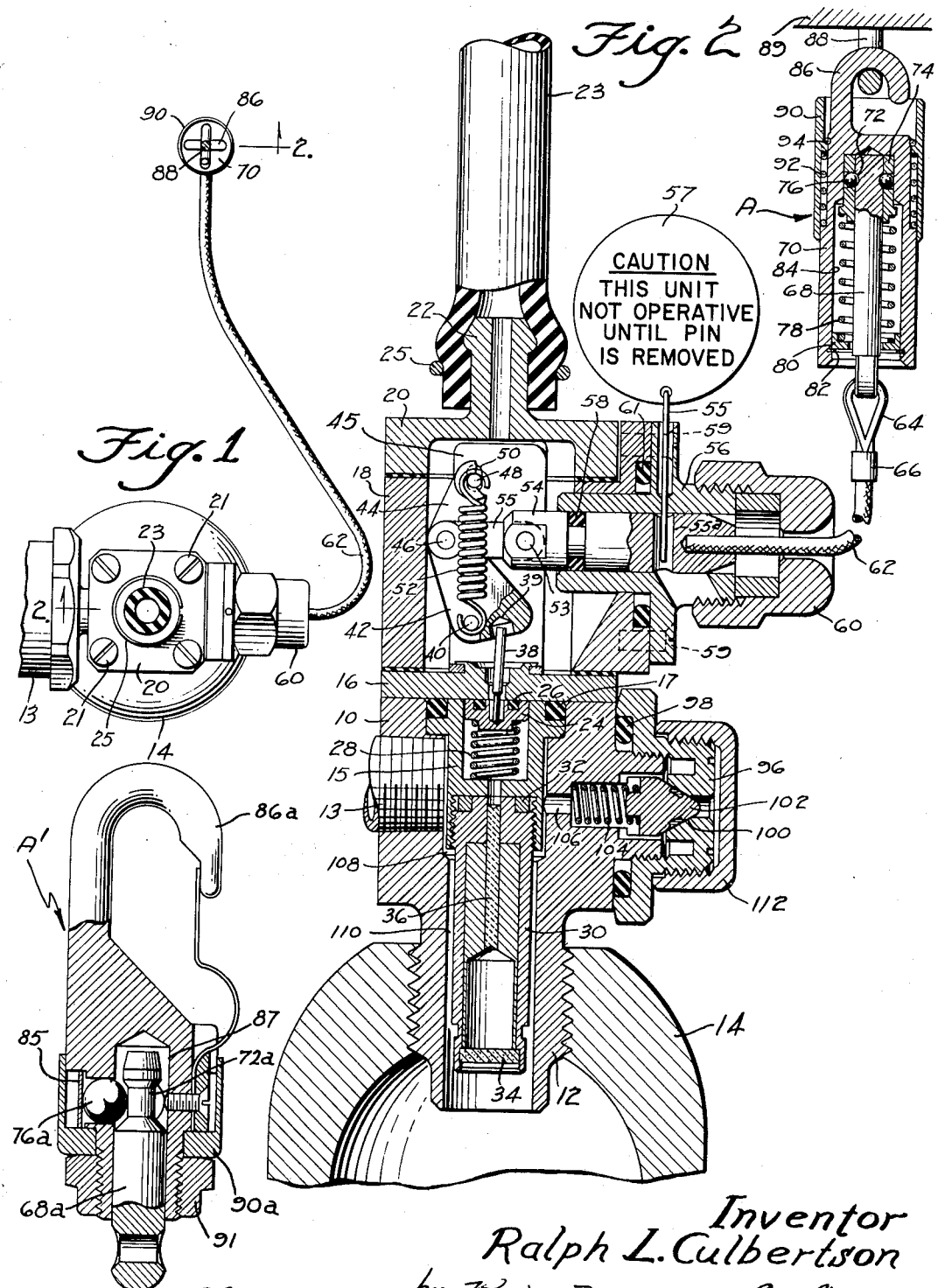
Inventor
Ralph L. Culbertson
by Bair, Freeman & Molinare
Attys.

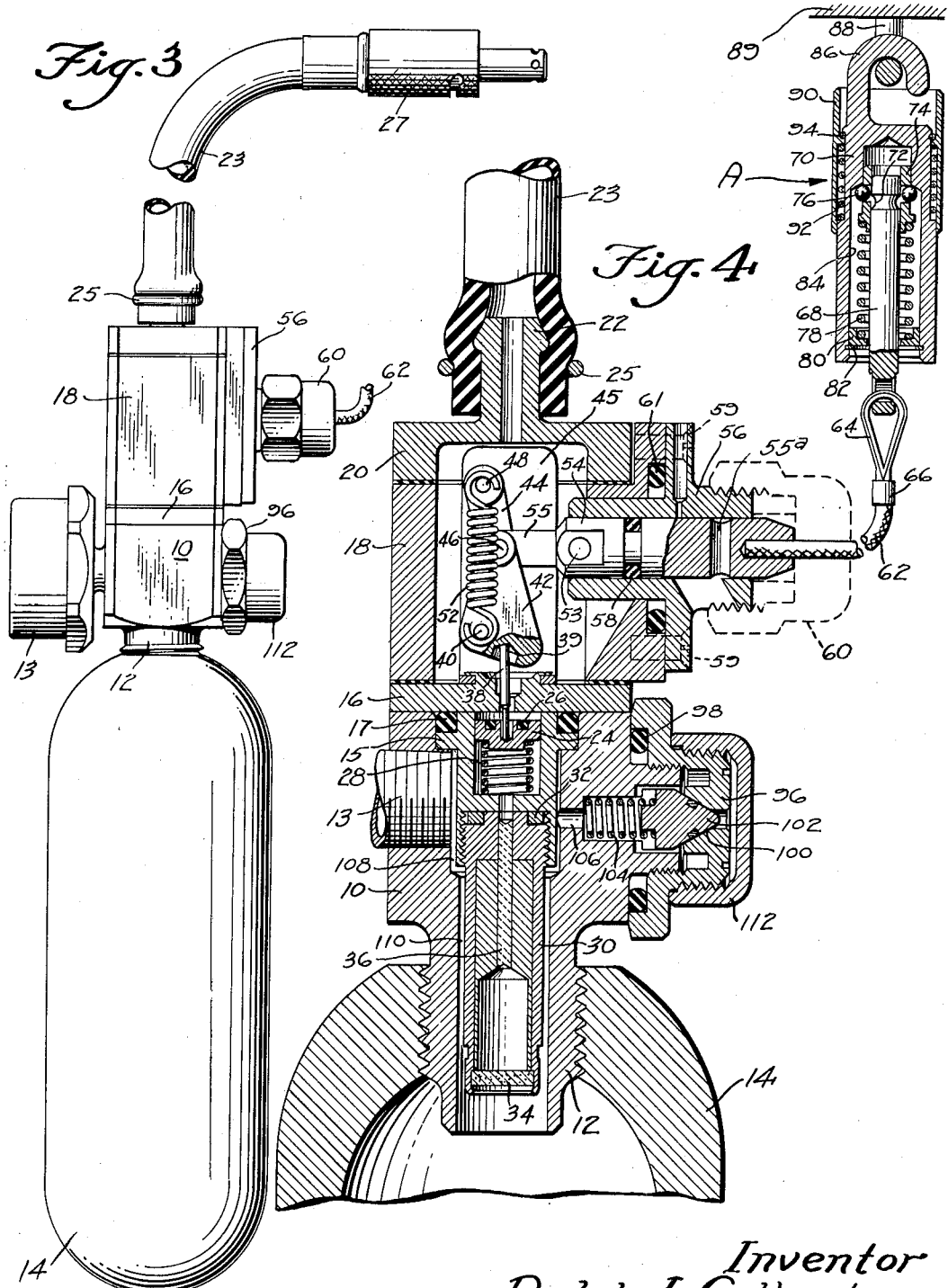

United States Patent Office 2,733,042
Patented Jan. 31, 1956

2,733,042

EMERGENCY OXYGEN VALVE

Ralph L. Culbertson, Bryan, Ohio, assignor to Aro Equipment Corporation, Bryan, Ohio, a corporation of Ohio Application December 13, 1954, Serial No. 474,870

11 Claims. (Cl. 251—75)

This invention relates to an emergency oxygen valve of comparatively simple, durable and inexpensive construction.

One object of the invention is to provide an emergency oxygen valve to be attached to a "bail-out" oxygen bottle, a discharge hose from the valve leading to a fitting that can be plugged into an aviator's oxygen mask and an actuating mechanism for the valve being in the form of a flexible cable terminating in a hook that can be used as a handle to manually open the valve or which can be connected to an eyebolt or the like in an airplane so that when an aviator makes a parachute jump, either preplanned or in an emergency, the oxygen valve will be automatically opened for supplying oxygen from the tank to the mask to avoid suffocation due to rarified atmosphere at high altitudes.

Another object is to provide an oxygen valve which is normally closed and a toggle mechanism which normally permits the valve to remain closed but which may be actuated to an over-center position, thereupon remaining in that position and keeping the valve in opened position thereby.

Still another object is to provide an oxygen valve of the character just referred to which has a comparatively simple means for resetting the valve to the closed position by removal of a cap which is screwed thereon and application of an inward push to reset stem which reverses the toggle mechanism to its initial position.

A further object is to provide a novel connecting device for the flexible cable relative to an eyebolt or the like wherein predetermined pull-apart force is required to disassociate a stem thereof from the remainder of the connecting device, which force is in excess of that required to operate the toggle mechansim of the valve to opened position, thereby insuring that the valve is opened before the connecting device pulls apart.

Still a further object is to provide a safety pin for the valve to prevent accidental opening thereof and a construction such that in case the aviator neglects to pull out the safety pin before jumping, the pin will be sheared off and thus not interfere with the operation of the toggle mechanism and the opening of the emergency valve.

An additional object is to provide an emergency valve including a filler check valve and a cap for enclosing the same, which cap can be removed and the oxygen bottle refilled through the check valve from an oxygen tank or other source of oxygen under pressure.

With these and other objects in view, my invention consists in the construction, arrangement and combination of the various parts of my emergency oxygen valve, whereby the objects above contemplated are attained, as hereinafter more fully set forth, pointed out in my claims and illustrated in detail on the accompanying drawings, wherein:

Fig. 1 is a plan view of an emergency oxygen valve embodying my present invention showing it attached to an oxygen bottle and illustrating a hose in section.

Fig. 2 is an enlarged vertical sectional view through my emergency oxygen valve as taken on the line 2—2 of Fig. 1 and showing the parts in normal (non-oxygen supplying) position.

Fig. 3 is a side elevation of Fig. 1 and shows a hose extending from the valve for plug-in conenction to the oxygen mask.

Fig. 4 is a sectional view similar to Fig. 2 showing the toggle mechanism actuated to open the oxygen valve; and Fig. 5 is a sectional view of a modified form of releasing device.

On the accompanying drawings I have used the reference numeral 10 to indicate a valve body. The valve body 10 has a threaded shank 12 screwed into the end of an oxygen-containing bottle 14. The valve body is covered with a cover plate 16 surmounted by a toggle housing 18 and a cover plate 20 therfor, the elements 16, 18 and 20 being secured to the valve body 10 as by four screws 21. Gaskets are interposed between 16 and 18 and between 18 and 20, as illustrated in Fig. 2 and a valve guide 15 is located in the valve body 10 and sealed relative to the element 16 by an O-ring 17.

A nipple 22 extends upwardly from the cover plate 20 and an oxygen discharge hose 23 is secured thereon by a clamp ring 25 and terminates in a plug-in fitting 27 of bayonet type for the oxygen mask.

Depending from the valve guide 15 is a filter sleeve 30 gasketed at 32 relative to the valve guide and provided in its lower end with a porous bronze filter 34. A ceramic metering pin 36 is located in the bore of the filter sleeve 30 to cooperate with the filter 34 in regulating the flow of oxygen from the bottle 14 through my emergency oxygen valve when the valve is opened, as will hereinafter appear.

The lower surface of the cover plate 16 constitutes a valve seat for a valve disc 24 having a seal ring 26 therein to seal against the plate 16. The valve disc 24 is normally in the seated position under the bias of a spring 28 seated in the valve guide 15. A valve stem 38 loosely mounted in the upper end of the disc 24 extends upwardly through the plate 16 and terminates in a socket 39 of a toggle lever 42. The lever 42 is pivoted on a pin 40 anchored to a U-shaped bracket 45 extending upwardly from the plate 16 and located in the toggle housing 18 and is pivoted at 46 to a second toggle lever 44 carrying a pivot pin 48 slidable in slots 50 of the bracket 45. The pivot pins 40 and 48 are connected together by over-center springs 52.

A reset stem 54 is slidable in a guide sleeve 56 therefor and sealed relative to the sleeve by an O-ring 58. A link 55 is pivoted to the pin 46 and enters a forked left end of the reset stem 54 to which it is pivoted on a pin 53. The guide sleeve 56 is secured to the housing 18 by screws 59 and sealed relative thereto by an O-ring 61. A cap 60 surrounds the cable 62 and is screwed onto the sleeve 56. A safety pin 55 extends into the sleeve 56 and enters an opening 55a of the reset stem 54 and a labeled tag or disk 57 is carried thereby.

A flexible cable 62 has one end secured in the reset stem 54 and its other end extends to a fair-lead 64 to which it is connected by a sleeve 66. The fair-lead 64 connects the cable 62 to a release stem 68 of a releasing device shown generally at A. The stem 68 extends into a sleeve 70 of the releasing device and is provided therein with a collar 74. The collar 74 is perforated for a plurality of balls 76 which are normally seated in a seat in the form of an annular groove 72 of the stem 68. A counterbore 84 is provided in the sleeve 70 to receive the balls 76 under certain circumstances, as will hereinafter appear. A spring 78 is interposed between the collar 74 and a washer 80 retained in position by a retainer 82.

The sleeve 70 terminates in a hook 86 which can be hooked in an eyebolt 88 or the like depending from the frame 89 of the airplane. To prevent accidental dislocation of the hook 86 from the eyebolt 88 a retainer sleeve 90 is provided and normally urged against a stop ring 94 by a spring 92.

In Fig. 5 I illustrate a modified form of releasing device indicated generally at A' in which parts comparable to those of the device A have the same reference numerals with the addition of "a." The release stem 68a is normally retained in a socket 87 of the hook 86a by the ball 76a which is held in the groove 72a of the stem by a C-shaped leaf spring 85 that releases the stem at a pull on the stem predetermined by the tension of the spring on the ball. The spring is enclosed by the sleeve 90a held on the hook 86a by a lock nut 91.

Means is provided for refilling the bottle 14 from an oxygen tank or other source of oxygen under pressure, and consists of a valve seat element 96 screwed onto the valve body 10 and sealed relative thereto by an O-ring 98. The fitting 96 has a seat 100 for a valve plug 102 which is a check valve and is normally retained seated by a spring 104 interposed between a shoulder of a passageway 106 entering the valve body 10 and the plug 102. The passageway 106 communicates with spaces 108 and 110 in the valve body through which the refilling oxygen flows into the bottle 14.

*Practical operation*

In the operation of my emergency oxygen valve, the bottle 14 and the valve are suitably supported on the wearing apparel of the aviator, in the parachute pack, or on any portion of the aircraft that remains with the aviator during enforced parachute jumps. The emergency oxygen valve may be installed such that it becomes a portion of the aircraft and will remain with the aircraft during periods of non-flight or becomes an item of the aviator's personal attire. In either case it will be necessary for the aviator to connect the hook 86 with the eyebolt 88, sliding the sleeve 90 rearwardly against the action of the spring 92 to do so. During pre-flight checks the aviator will pull the safety pin 55 by grasping the tag 57 and will also connect the fitting 27 into his mask. When he jumps from the aircraft the cable 62 will first become taut and then the spring 78 will be compressed as the release stem 68 is pulled out of the sleeve 70.

When reaching the position of Fig. 4, the stem 68 is released by the balls 76 because they can move radially outward into the counterbore 84. The tension of the spring 78 just before release is somewhat greater than the pull required for tripping the toggles 42 and 44 from the Fig. 2 position to the Fig. 4 position so as to insure that they are tripped.

In the tripped position of Fig. 4 the toggle 42 has depressed the pin 38 for unseating the valve 24 from the cover plate 16 so that oxygen can flow from the bottle 14 through the filter 34 and past the metering pin 36 into the valve guide 15 and then around the edge of the disc 24, which edge may be grooved or made polygon shaped to permit of the passage of the oxygen therearound and through the opening in the cover plate 16 around the stem 38. It then flows out through the nipple 22 and the hose 23 to the fitting 27 and from thence into the oxygen mask at a rate metered by the pin 36.

In the event the aviator neglects to pull the safety pin 55, it will be sheared off by the edge of the opening 55a in the reset stem 54, the shearing strength being less than the predetermined tension of the spring 78 which may be, for instance, 40 pounds as against 20 pounds for operation of the toggle levers 42 and 44 under the action of their springs 52. The safety pin is provided to prevent accidental opening of the valve 24 when the cable 62 is dangling from the oxygen valve as the aviator walks around and in case the connecting device terminating in the hook 86 catches on any obstruction.

After the device has been used as above explained, and it is desirable to refill the oxygen bottle 14, it is first necessary to reset the toggle mechanism and this can be done by removing the cap 60, whereupon the extending end of the reset stem 54 in the position shown in Fig. 4 can be pushed back into the position of Fig. 2 where the over-center springs 52 will retain it in the valve-closed position.

The cap 60 may then be replaced and the cap 112 removed, whereupon a fitting can be screwed in place of the cap 112 for refilling the bottle 14. The refilling pressure opens the check valve 102 and this check valve is automatically reseated when the filler connection is discontinued, whereupon the cap 112 is replaced for covering the check valve. At any time the pressure in the oxygen bottle 14 can be checked on a pressure gauge 13 which is screwed into the valve body 10.

While I have described my device as an emergency oxygen valve, it can be used in casses which are not emergencies, as when a parachute jump at high altitude is preplanned or it may be used as a walk-around unit providing the aviator with an oxygen supply during times that the aviator is not connecetd to the ship's oxygen supply. The emergency oxygen valve, when operated as mentioned above, may be actuated manually by grasping the tab 57, thereby removing the safety pin 55 and then pulling the hook 86 by hand until the valve opens.

Also, the device can be used for life rafts for inflating them automatically as they are thrown from a ship, or the toggle trip mechanism may be used for other purposes where it is desirable to automatically open a valve in response to the movement from one device away from another. The projection of the reset stem 54, as in Fig. 4, permits ready resetting of the toggle mechanism without having to disassemble the valve structure and requires only the removal and replacement of the cap 60 and pushing inward of the reset stem to reclose the valve so that the device can be again used.

Some changes may be made in the construction and arrangement of the parts of my disclosed oxygen valve without departing from the real spirit and purpose of my invention, and it is my intention to cover by my claims any modified forms of structure or use of mechanical equivalents which may reasonably be included within their scope.

I claim as my invention:

1. In an emergency oxygen valve, a valve body, a valve therein, resilient means to bias said valve normally closed, toggle mechanism to open said valve, over-center spring means normally retaining said toggle mechanism in position permitting said valve to remain closed, a flexible element having one end connected with said toggle mechanism to open said valve and cause said spring means to pass over center and thereby retain said toggle mechanism in valve-opened position, and a releasing device on the free end of said flexible element having means for releasing said flexible element after predetermined pull thereon in excess of that required to cause said spring means to pass over center and thereby retain said toggle mechanism in valve-opened position.

2. In a valve for oxygen and the like, a valve body, a valve therein, resilient means to bias said valve normally closed, toggle mechanism to open said valve, a flexible element extending from said toggle mechanism, and a releasing device on the free end of said flexible element having means for releasing said flexible element after predetermined pull thereon in excess of that required to cause said toggle mechanism to open said valve.

3. In a valve for oxygen or the like, a valve body, a valve therein, resilient means to bias said valve normally closed, toggle mechanism to open said valve and including a reset stem, over-center spring means normally retaining said toggle mechanism in position permitting said valve to remain closed, a flexible element having one end connected with said reset stem of said toggle mechanism to open said valve and cause said spring means to pass over center and thereby retain said toggle mechanism in valve-opened position, a releasing device on the free end of said flexible element having means for releasing said flexible element after predetermined pull thereon in excess of that required to cause said spring means to pass over center and thereby retain said toggle mechanism in valve-opened position, and a cap for said reset stem, said cap being removable to permit access to said reset stem for resetting said toggle mechanism to its initial position.

4. In an emergency oxygen valve, a valve body, a valve therein, resilient means to bias said valve normally closed, toggle mechanism to open said valve and including a reset stem, a flexible element having one end connected with said reset stem to open said valve, a releasing device on said flexible element having means for releasing said flexible element after predetermined pull thereon in excess of that required to cause said toggle mechanism to open said valve, and a removable cap for said reset stem to permit access thereto for resetting said toggle mechanism to its initial position.

5. In an emergency oxygen valve, a valve body, a valve therein, resilient means to bias said valve normally closed, toggle mechanism to open said valve and including a reset stem, over-center spring means normally retaining said toggle mechanism in position permitting said valve to remain closed, a flexible element connected with said reset stem of said toggle mechanism to open said valve and cause said spring means to pass over center and thereby retain said toggle mechanism in valve-opened position, a releasing device on the free end of said flexible element having means for releasing said flexible element after pull thereon in excess of that required to cause said spring means to pass over center and thereby retain said toggle mechanism in valve-opened position, and a removable cap for said reset stem.

6. In an emergency oxygen valve, a valve body, a valve therein, resilient means to bias said valve normally closed, toggle mechanism to open said valve and including a reset stem, a safety pin normally retaining said reset stem in reset position, over-center spring means normally retaining said toggle mechanism in position permitting said valve to remain closed, a flexible element having one end connected with said reset stem of said toggle mechanism to open said valve after said safety pin is removed and cause said spring means to pass over center and thereby retain said toggle mechanism in valve-opened position, a releasing device on the free end of said flexible element having means for releasing said flexible element after predetermined pull thereon in excess of that required to cause said spring means to pass over center and thereby retain said toggle mechanism in valve-opened position, said reset stem and safety pin cooperating to shear said safety pin if it is not removed when said flexible element is pulled upon to operate said toggle mechanism, and a cap for said reset stem, said cap being removable to permit access to said reset stem for resettting said toggle mechanism to its initial position.

7. In an emergency oxygen valve, a valve body, a valve therein, resilient means to bias said valve normally closed, toggle mechanism to open said valve and including a reset stem, a safety pin normally retaining said reset stem in reset position, over-center spring means normally retaining said toggle mechanism in position permitting said valve to remain closed, a flexible element having one end connected with said reset stem of said toggle mechanism to open said valve after said safety pin is removed and cause said spring means to pass over center and thereby retain said toggle mechanism in valve-opened position, and a releasing device on the free end of said flexible element having means for releasing said flexible element after predetermined pull thereon in excess of that required to cause said spring means to pass over center and thereby retain said toggle mechanism in valve-opened position, said reset stem and safety pin cooperating to shear said safety pin if it is not removed when said flexible element is pulled upon to operate said toggle mechanism.

8. In a valve structure of the character disclosed, a valve body, a valve therein, resilient means to bias said valve normally closed, toggle mechanism to open said valve, over-center spring means normally retaining said toggle mechanism in position permitting said valve to remain closed, a flexible element having one end connected with said toggle mechanism to open said valve and cause said spring means to pass over center and thereby retain said toggle mechanism in valve-opened position, a releasing device on the free end of said flexible element having means for releasing said flexible element after predetermined pull thereon in excess of that required to cause said spring means to pass over center and thereby retain said toggle mechanism in valve-opened position, said releasing device comprising a sleeve, a stem slidable therein, a spring normally retaining said stem inwardly relative to said sleeve, a collar on said stem having openings therein, and balls in said openings between said stem and sleeve, said stem having a seat normally receiving said balls and said sleeve having a counter bore to receive said balls when said spring is compressed to a predetermined degree thereby releasing said balls from said seat and said stem from said sleeve.

9. In a valve structure of the character disclosed, a valve body, a valve therein, resilient means to bias said valve normally closed, toggle mechanism to open said valve, over-center spring means normally retaining said toggle mechanism in position permitting said valve to remain closed, a flexible element having one end connected with said toggle mechanism to open said valve and cause said spring means to pass over center and thereby retain said toggle mechanism in valve-opened position, a releasing device on the free end of said flexible element having means for releasing said flexible element after predetermined pull therein in excess of that required to cause said spring means to pass over center and thereby retain said toggle mechanism in valve-opened position, said releasing device comprising a sleeve, a stem slidable therein, a spring normally retaining said stem inwardly relative to said sleeve, a collar on said stem having openings therein, balls in said openings between said stem and sleeve, said stem having a seat normally receiving said balls and said sleeve having a counter bore to receive said balls when said spring is compressed to a predetermined degree thereby releasing said balls from said seat and said stem from said sleeve, a hook on said sleeve, a retainer sleeve slidable on said sleeve, and spring means normally sliding said retainer sleeve to position for closing said hook.

10. In an emergnecy oxygen valve, a valve body, a valve therein, resilient means to bias said valve normally closed, toggle mechanism to open said valve, a flexible element having one end connected with said toggle mechanism to open said valve, a releasing device on the free end of said flexible element having means for releasing said flexible element after predetermined pull thereon, said releasing device comprising a sleeve, a stem slidable therein, a spring normally retaining said stem inwardly relative to said sleeve, a collar on said stem having openings therein, and balls in said openings between said stem and sleeve, said stem having a seat normally receiving said balls and said sleeve having a counter bore to receive said balls when said spring is compressed to a predetermined degree in excess of that required to cause said spring means to pass over center and thereby retain said toggle mechanism in valve-opened position, thereby releasing said balls from said seat and said stem from said sleeve, a hook on said sleeve, a retainer sleeve slidable on said sleeve, and spring means normally sliding said retainer sleeve to position for closing said hook.

11. In an emergency oxygen valve, a valve body, a valve therein, resilient means to bias said valve normally closed, toggle mechanism to open said valve and including a reset stem, over-center spring means normally retaining said toggle mechanism in position permitting said valve to remain closed, a flexible element having one end connected with said reset stem of said toggle mhecanism to open said valve and cause said spring means to pass over center and thereby retain said toggle mechanism in valve-opened position, a releasing device on the free end of said flexible element having means for releasing said flexible element after predetermined pull thereon in excess of that required to cause said spring means to pass over center and thereby retain said toggle mechanism in valve-opened position, said releasing device comprising a release stem, a hook member having a socket receiving said stem, said stem having a seat, a ball in said socket and entering said seat and a spring biasing said ball into said seat with predetermined force.

References Cited in the file of this patent

UNITED STATES PATENTS

| | | |
|---|---|---|
| 2,070,661 | Hughes | Feb. 16, 1937 |
| 2,329,289 | Morehouse | Sept. 14, 1943 |

FOREIGN PATENTS

| | | |
|---|---|---|
| 501,236 | Great Britain | 1939 |
| 1,028,530 | France | 1953 |